March 2, 1954 E. R. SHENK ET AL 2,671,132

ELECTRONIC MULTIPLEX TRANSMITTER

Filed Feb. 16, 1951

7 Sheets-Sheet 1

INVENTORS
EUGENE R. SHENK,
ARTHUR E. CANFORA
AND ANTHONY LIGUORI
BY
Charles H. Brown
ATTORNEY INVENTORS
EUGENE R. SHENK,
ARTHUR E. CANFORA
AND ANTHONY LIGUORI
BY Charles H. Brown
ATTORNEY March 2, 1954

E. R. SHENK ET AL 2,671,132

ELECTRONIC MULTIPLEX TRANSMITTER

Filed Feb. 16, 1951

7 Sheets-Sheet 3

INVENTORS
EUGENE R. SHENK,
ARTHUR E. CANFORA
AND ANTHONY LIGUORI
BY
Charles H. Brown
ATTORNEY March 2, 1954

E. R. SHENK ET AL 2,671,132

ELECTRONIC MULTIPLEX TRANSMITTER

Filed Feb. 16, 1951

7 Sheets-Sheet 4

INVENTORS
EUGENE R. SHENK,
ARTHUR E. CANFORA
AND ANTHONY LIGUORI
BY
Charles H. Brown
ATTORNEY INVENTORS
EUGENE R. SHENK,
ARTHUR E. CANFORA
AND ANTHONY LIGUORI
BY
Charles H. Brown
ATTORNEY 42 6/7 SE/s INVENTOR
EUGENE R. SHENK,
ARTHUR E. CANFORA AND
ANTHONY LIGUORI
BY Charles H. Brown
ATTORNEY 50 SE/s INVENTORS
EUGENE R. SHENK,
ARTHUR E. CANFORA
AND ANTHONY LIGUORI
BY
Charles H. Brown
ATTORNEY Patented Mar. 2, 1954

2,671,132

UNITED STATES PATENT OFFICE 2,671,132

ELECTRONIC MULTIPLEX TRANSMITTER

Eugene Richard Shenk, Fairlawn, N. J., and Anthony Liguori, New York, and Arthur Eugene Canfora, Brooklyn, N. Y., assignors to Radio Corporation of America, a corporation of Delaware Application February 16, 1951, Serial No. 211,272

17 Claims. (Cl. 178—50)

Figure 1:
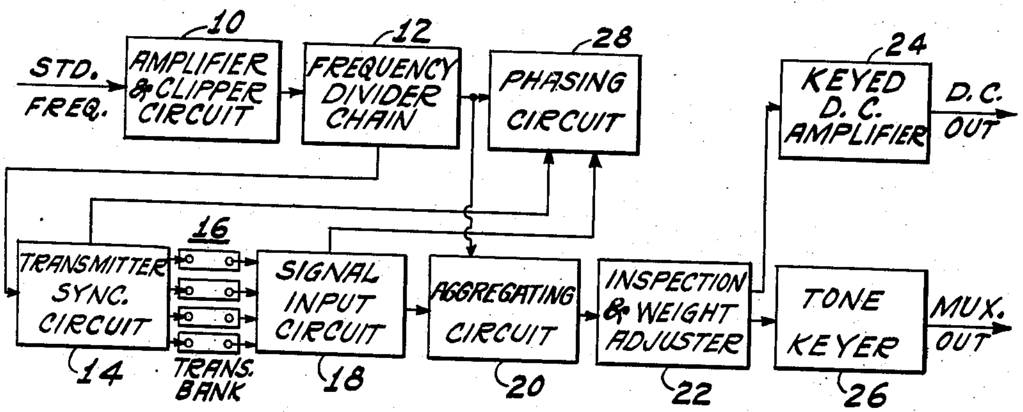

The invention relates to systems for multiplexing a plurality of signals on a time division basis, and it particularly pertains to an electronic transmitter arrangement for combining elements of individual signal trains into a composite signal train.

In the time division multiplexing art, individual elements obtained from a plurality of trains of signal elements are sequentially assigned to a common transmission medium, or obtained from a common transmission medium and sequentially assigned to different utilization devices in predetermined order. The first process is known as "aggregating" in the telegraphic multiplexing art, and the order in which the elements are assigned is termed the "aggregation," and the second process is termed "channelizing." The shortest signal element of the composite signal train is termed the "aggregate signal element," and the shortest signal element of each channel signal train is termed the "channel signal element." The shortest complete cycle of aggregate signal elements is termed the "aggregate" and is of time duration equal to that of a channel signal element. Thus the channel signal elements are $n$ times greater in time duration than the aggregate signal elements; where $n$ is the number of channels aggregated in the system. While these terms are not generally employed in allied arts to which multiplexing techniques are applicable, the usage thereof will be readily understood by those skilled in the art.

Heretofore, the aggregation of telegraph signals for multiplex operation has been largely done electromechanically. One such system is described in an article appearing in the Proceedings of the Institute of Radio Engineers, January 1938, entitled "Time-Division Multiplex in Radiotelegraphic Practice" by Messrs. J. L. Callahan, R. E. Mathes and A. Kahn. Such systems require motors, commutators, brushes and the like, which systems are disadvantageous in that a large degree of maintenance is necessary to insure proper operation at all times.

It is an object of the invention to provide an improved electronic circuit arrangement for aggregating telegraph or other similar signals for time-division multiplex operation.

It is another object of the invention to provide a simplified electronic circuit arrangement for selecting different aggregations of telegraph or similar signals in a time-division multiplex system.

It is a further object of the invention to provide an electronic multiplex circuit arrangement enabling interchannel phasing in a simpler and more accurate manner than heretofore known.

It is still another object of the invention to provide an electronic circuit incorporating simplified means to adjust operation of each transmitting distributor over a tolerable range independently of all others.

It is a specific object of the invention to provide an improved all-electronic circuit arrangement for selecting individual elements from a plurality of applied trains of signal elements and combining them in predetermined order into a composite train of signal elements.

It is a more specific object of the invention to provide an improved and simplified electronic circuit arrangement for selecting individual elements of a plurality of trains of telegraph signals and assigning them to a common transmission medium in predetermined order of said trains.

The foregoing objects of the invention are attained in an electronic unit arranged to receive one or more signals from several sources, such as transmitting distributors or from a diplex distributor or a combination of both. The received signals are combined with coincidence voltages from standard frequency sources. The combined signal is applied to an inspection circuit where the composite signal is aggregated on the basis of a short inspection of each channel signal element. If desired, a monostable multivibrator circuit may be employed to delay each space-to-mark transition in order to make the transmitted signal lighter than it otherwise would be to compensate for overweighting in the space path transmission. A potentiometer controls the amount of delay of each transition from space to mark. The output of this section may be applied to a tone keyer to provide a keyed tone output. Frequency divider circuitry operating from a standard frequency source is employed to derive a pulse which is applied to a synchronizing section to trigger four monostable multivibrator circuits. On restoration, these monostable circuits supply the necessary synchronizing pulses to the various transmitting distributors. Each multivibrator circuit has, as part of its timing circuit, a potentiometer adjustable to vary the restoration time of the multivibrator to phase the transmitting distributor signal with the timing coincidence signals of the unit. The incoming signal is compared with the timing coincident signal in a phasing circuit, and when the two signals are in phase, a normally blinking neon lamp is extinguished. Each of the channels is phased independently of all of the others. A master switch is provided in order to adapt the circuit to operate with the type of aggregation or composite signal desired.

Figure 5:
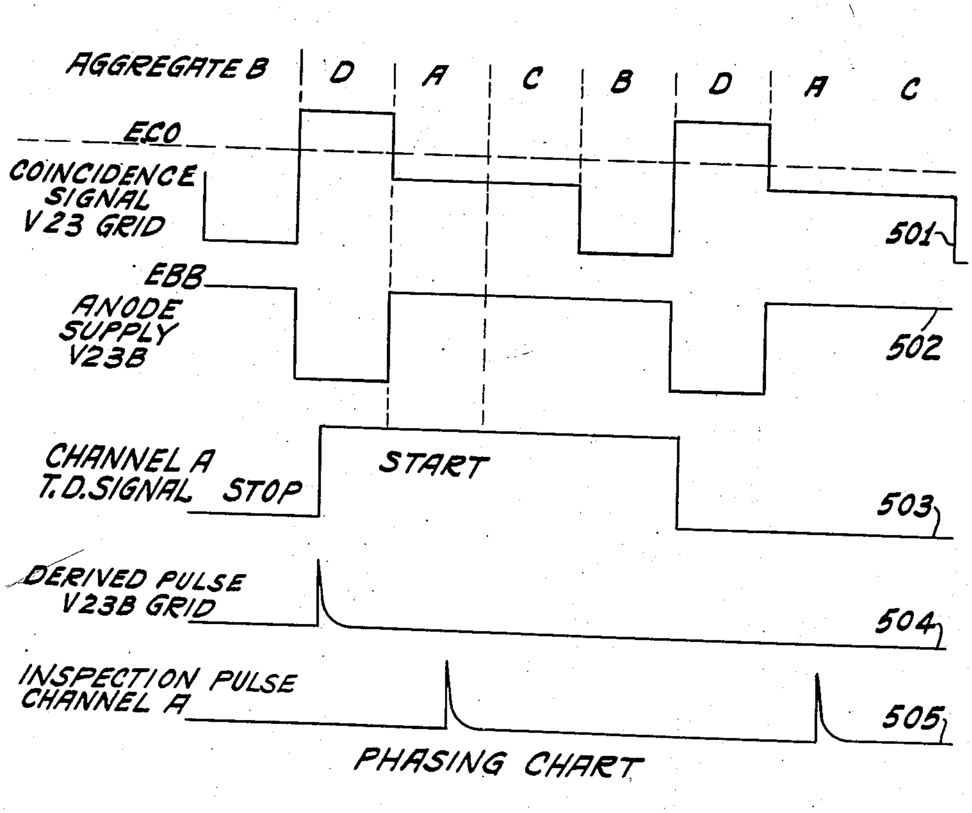
Figure 3:
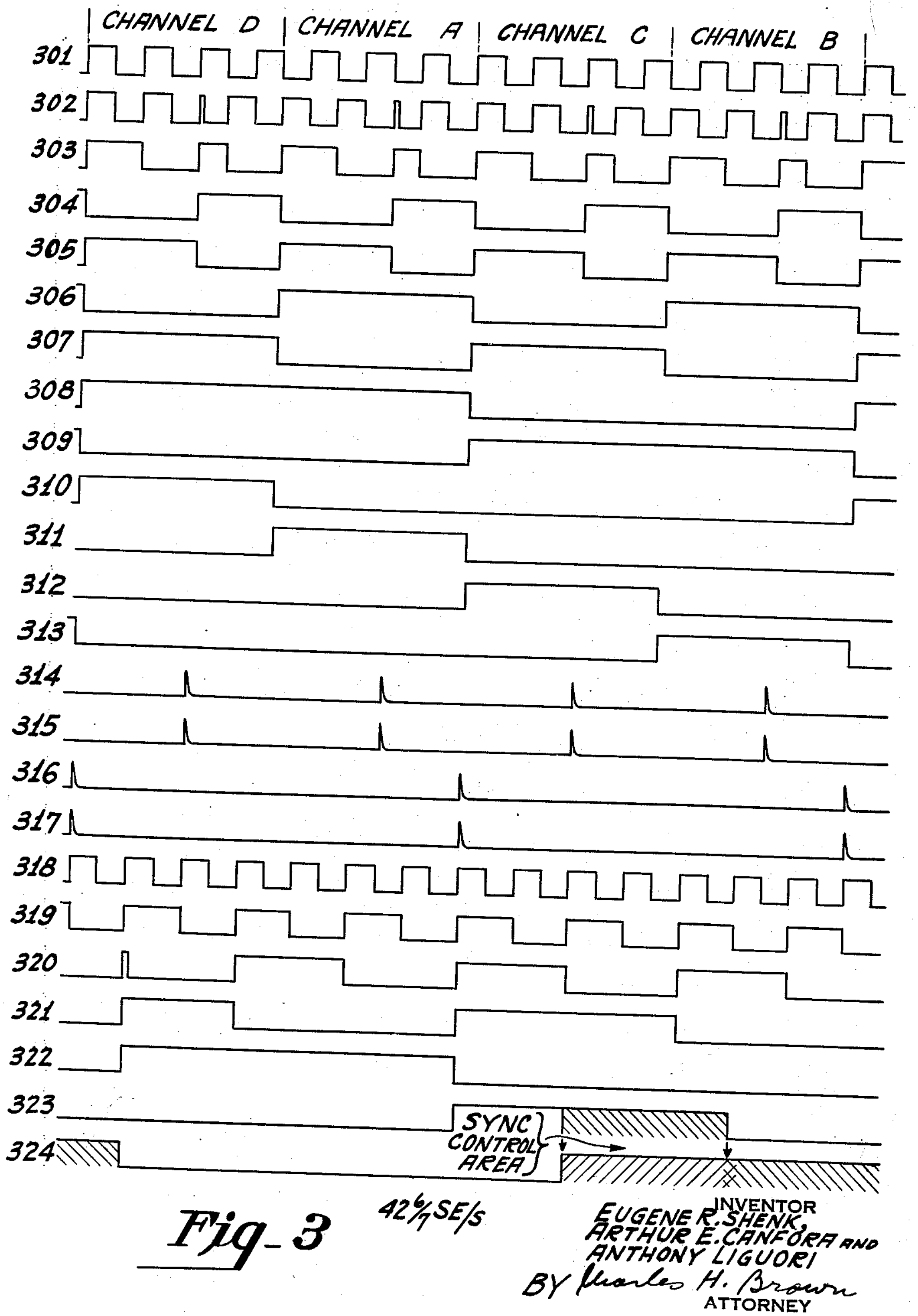
Figure 4:
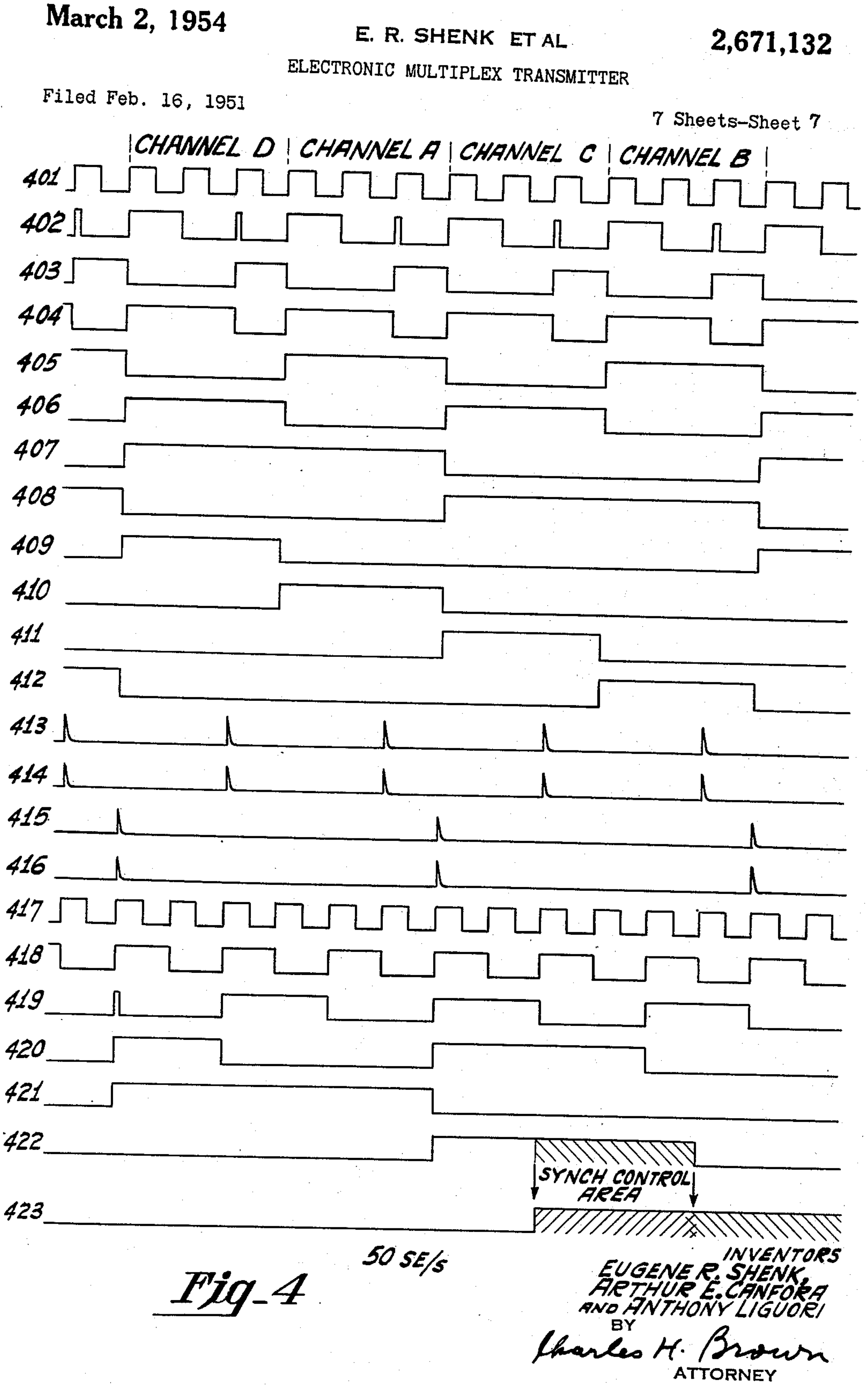

The invention will be described in greater detail with reference to the accompanying drawing forming a part of the specification and in which:

Fig. 1 is a functional diagram of an electronic multiplex transmitter according to the invention;

Fig. 2 (Figs. 2*a*, 2*b*, 2*c* and 2*d* being taken together) is a schematic diagram of a multiplex transmitter according to the invention;

Figs. 3 and 4 are graphical representations of the phase relationships of the various waveforms developed in the system according to the invention for two different rates of transmission; and Fig. 5 is a graphical representation of the phase relationships between various component voltages of the system according to the invention.

Referring to Fig. 1, there is shown a functional diagram of an electronic multiplex transmitter according to the invention. An amplifier and clipper circuit 10 to which a standard frequency wave is applied generates a square wave which is applied to a frequency divider chain 12 which is employed to develop timing waves of different frequencies. One such timing wave is applied to transmitter synchronizing circuits 14 in order to activate a plurality of transmitters at the proper time shown here as a bank of terminals 16. Tape transmitters of known type have their output terminals connected to bank 16 to apply signals to signal input circuits 18 after which the various signal inputs are aggregated in an aggregating circuit 20 the output of which is inspected and the weight of the signal adjusted in an output signal regenerator circuit including an inspection and weight adjuster section 22. The aggregate multiplex signal after adjustment may be taken from a keyed D.-C. amplifier 24 or from a tone keyer 26. A phasing circuit 28 is connected to frequency divider chain 12, transmitter synchronizing circuits 14 and signal input circuits 18 and is provided for the purpose of checking and adjusting the phase relationship between those three circuits.

Figure 2A:
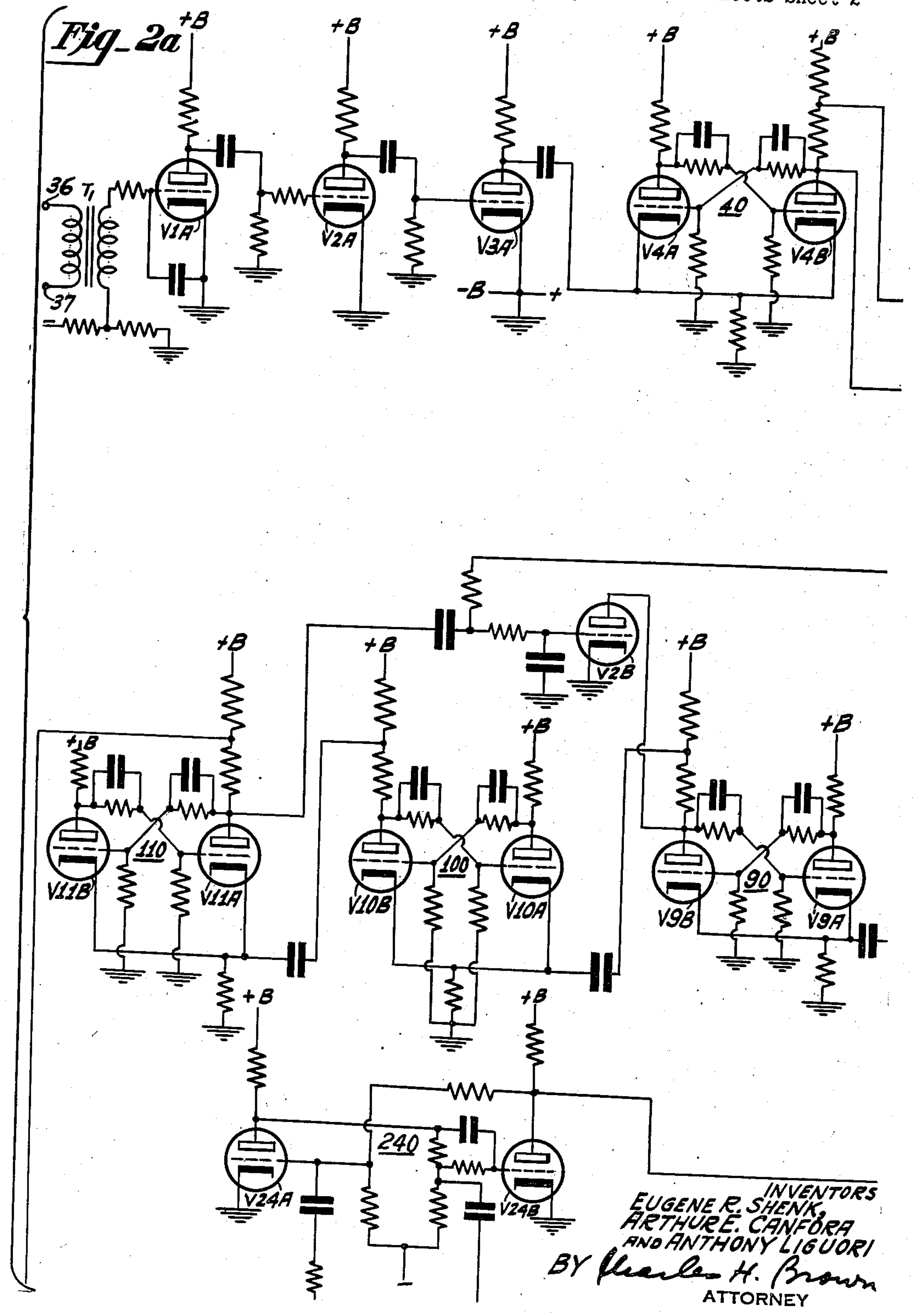
Figure 2B:
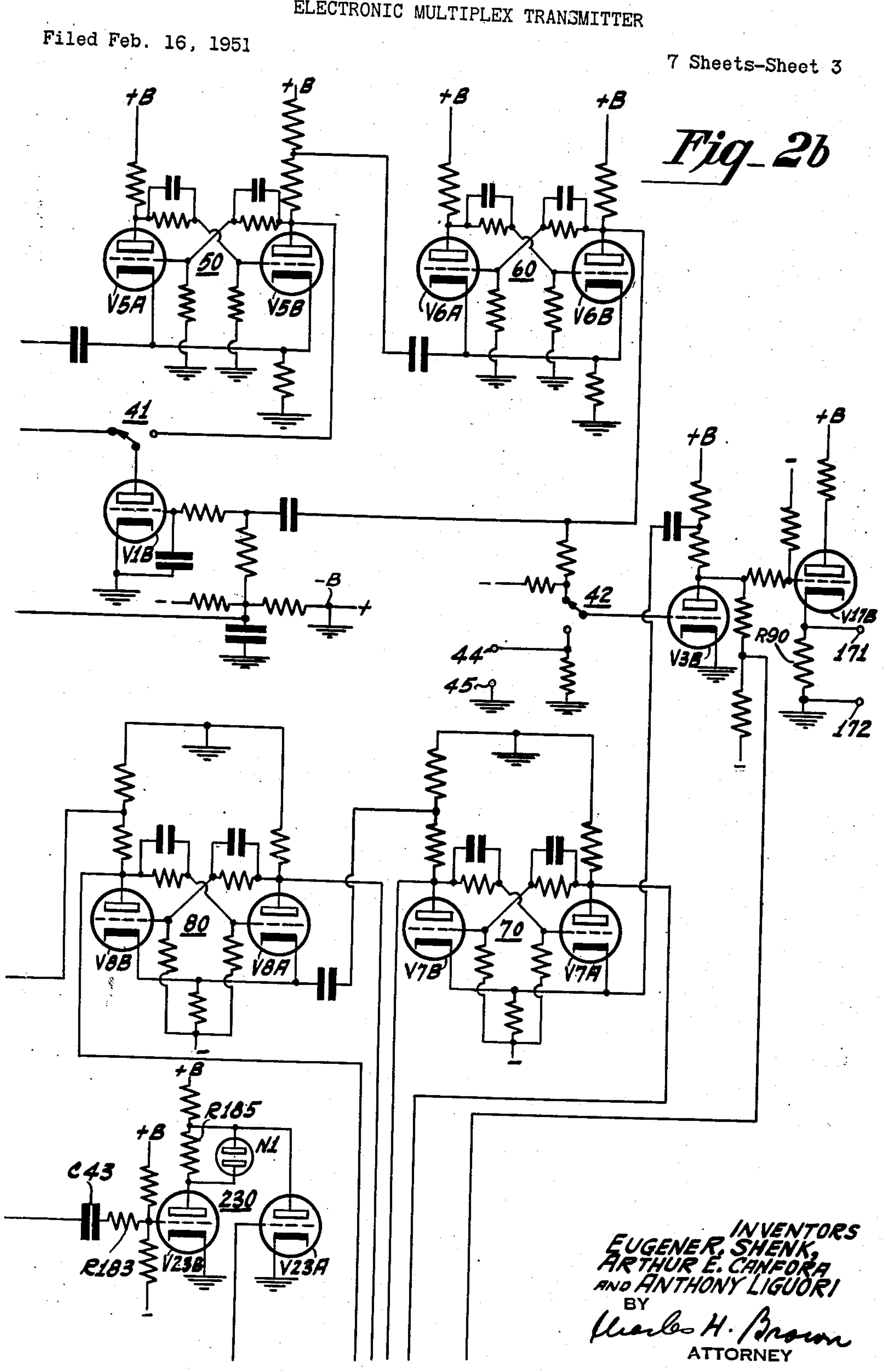

Referring to Figs. 2*a* and 2*b*, there is shown a schematic diagram of a preferred embodiment of circuits for developing the desired coincidence voltages or timing waves as indicated by blocks 10 and 12 of Fig. 1.

*Timing wave generation*

A standard frequency wave, preferably 600 C. P. S., is applied to input terminals 36, 37 of a transformer T1. The wave is amplified and clipped in tubes V1A, V2A and V3A. Pulses are derived from each transition at the anode of tube V3A, which pulses are applied to trigger the bistable multivibrator composed of vacuum tubes V4A, V4B for division by one. Tubes V5A—V5B, V6A—V6B and V7A, V7B are connected as bistable multivibrators in what is essentially a binary counting circuit, sometimes referred to as ordinary flip-flop binaries, each providing division by a factor of two. Normally the array would divide the 600 C. P. S. by a factor of eight. The inclusion of a reset tube V1B changes the count to division by seven or division by six depending on the setting of a switch 41. When switch 41 is set as shown in Fig. 2*b*, one pulse is injected into tube V4B from tube V1B for every seven pulses from tube V3A. The result at multivibrator stage 70 comprising tubes V7A and V7B is division of the 600 cycles per second input wave in frequency by a factor of seven, resulting in a wave of 85 5/7 C. P. S. This is shown graphically in Fig. 3, the timing chart for operation at the rate of 42 6/7 signal elements per second.

Referring to Fig. 3, curves 301—317 illustrate the relative timing at a signal rate of 42 6/7 channel signal elements per second. Curve 301 represents the 600 C. P. S. standard frequency wave at the anode of tube V3A; while curve 302 represents the wave at the anode of tube V4B. Curves 303—309 represent the anode voltages of tubes V5B, V6B, V3B, V7A, V7B, V8A and V8B respectively. The coincidence signals for channels D, A, C, B in that order are represented by curves 310—313, these curves being representative of the grid voltages on tubes V16B, V15A, V15B and V16A respectively. Curves 314—315 represent the inspection pulse trains for aggregation 1, 3, 4, 5; the former being the grid voltage at tube V19B and the latter being the grid voltage at tube V19A. The same voltages are represented for aggregation 2, 5 by curves 316 and 317 respectively.

Curves 318—324 comprise a synchronization chart. Curve 318 represents the voltage wave at the anode of tube V7A and at the cathode of tube V7B for diplex operation at 85 5/7 C. P. S. For transmitting distributor operation at 6 6/49 C. P. S., curve 319 represents the 42 6/7 C. P. S. wave at the anode of tube V8B: 320 the wave at tube V9B anode, 321 the wave at tube V10B anode; and curve 322 represents the wave at tube V11A anode. Curve 323 represents the anode voltages of tubes V25B, V27B, V28B and V29B, while curve 324 represents those voltages for tubes V26A, V26B, V30A and V30B.

When switch 41 is set in the other position, one pulse is injected into tube V5B, which is the equivalent of injecting two pulses into tube V4B. The result at multivibrator stage 70 is division of the 600 C. P. S. input wave in frequency by a factor of six, resulting in a wave of 100 C. P. S. This is shown graphically in Fig. 4, the timing chart for operation at the rate of 50 signal elements per second.

Referring to Fig. 4, curves 401—416 illustrate the relative timing at a signal rate of 50 signal elements per second. Curve 401 represents the 600 C. P. S. standard frequency wave at the anode of tube V4B. Curves 402—408 represent the anode voltages of tubes V5B, V6B, V3B, V7A, V7B, V8A and V8B respectively. The coincidence signals for channels D, A, C, B, in that order are represented by curves 409—412, these curves being representative of the grid voltages on tubes V16B, V15A, V15B and V16A respectively. Curves 413—414 represent the inspection pulse trains for aggregation 1, 3, 4, 5; the former being the grid voltages at tube V19B and the latter being the grid voltage at tube V19A. The same voltages are represented for aggregation 2, 5 by curves 415 and 416 respectively.

Curves 417—423 comprise a synchronization chart. Curve 417 represents the voltage wave at the anode of tube V7A and at the cathode of tube V7B for diplex operation at 100 C. P. S. For transmitting distributor operation at 7½ C. P. S., curve 418 represents the 50 C. P. S. wave at the anode of tube V8B; 419 the wave at tube V9B anode, 420 the wave at tube V10B anode; and curve 421 represents the wave at tube V11A anode. Curve 422 represents the anode voltages of tubes V25B, V27B, V28B and V29B, while curve 424 represents those voltages for tubes V26A, V26B, V30A and V30B.

The output wave from multivibrator stage 70 is divided in frequency by a factor of two for a resultant wave of either 42⁶⁄₇ C. P. S. or 50 C. P. S. depending on the setting of switch 41. Combinations of the anode output voltages of tubes V7A, V7B, V8A and V8B constitute the coincidence signals shown on the timing charts.

Counter chain stages 90, 100 and 110 are bistable multivibrators operating as ordinary flip-flop binaries, each providing division by a factor of two. The normal overall dividing factor would be eight, but the inclusion of a reset tube V2B in the chain reduces the overall resultant to a factor of seven.

Each negative transition at the anode of tube V11A triggers multivibrator circuits in the synchronizing section.

In multiplex operation, it sometimes is desirable at certain stations or terminals to be able to operate the transmitting multiplexer from a corrected synchronizing frequency supplied by the multiplex receiver. Switch 42 is included to allow a choice between operation from an independent source of standard frequency applied to input terminals 36, 37 or from a corrected synchronizing frequency from the associated receiving multiplex equipment applied to terminals 44, 45.

TRANSMITTER SYNCHRONIZING CIRCUITS

Synchronizing circuits section 14 is employed to supply synchronizing pulses to the several tape transmitting distributors and diplex distributors. A pulse from frequency divider multivibrator stage 110 at character rate is applied by way of lead 112 to trigger monostable tape transmitter synchronizing multivibrator circuits 250, 270, 280 and 290 simultaneously. The portion for synchronizing the transmitting distributor for signals to channel A consists of a synchronizing multivibrator stage 250 comprising tubes V25A and V25B, tube V26A and associated components. When the multivibrator 250 is restored to its stable condition, that is, tube V25B conducting, a negative pulse is coupled through a capacitor C48 and a resistor R198 to the grid of tube V26A and blocks V26A for an interval determined by the values of the capacitors and resistors in the grid circuit.

This creates a positive voltage across resistors R200, R201 which is coupled at terminal 204 to the so-called "eighth pulse" coil of a transmitting distributor (not shown). The "eighth pulse" so generated is effective to cause the transmitting distributor to operate for one character. Preferably, there will be a polar relay between terminal 204 and the "eighth pulse" coil of the transmitting distributor. Any circuit supplying the correct amount of current can be connected between terminal 204 and the "eighth pulse" coil. A potentiometer 253 in the grid return of tube V25B permits the active time of multivibrator circuit 250 to be varied and this changes the time position of the "eighth pulse" with respect to the pulse triggering the multivibrator circuit. This positioning is necessary for phasing purposes.

The portion of the circuit for synchronizing channel C consists of a multivibrator stage 270 comprising tubes V27A and V27B, tube V26B and associated components. Its operation is the same as previously described for channel A. The portions for channel B and channel D are multivibrator circuit 280 comprising tubes V28A, V28B, tube V30A and multivibrator circuit 290 comprising tubes V29A, V29B, V30B and associated components, respectively.

The portion of the circuit that supplies synchronizing voltage to the diplex distributors consists of tube V14B and associated components. It consists of a square wave at 171³⁄₇ C. P. S. delivered to terminals 171 and 172. The actual synchronizing is done in the diplex distributors, as is described in greater detail below.

SIGNAL INPUT AND AGGREGATING CIRCUITS

The outputs from the tape transmitters are applied to four signal input circuits consisting of vacuum tubes V12A, V12B, V13A, V13B, V14A, V14B and associated components. Two of the input circuits are direct and two are indirect. Channel A and D input circuits are direct and channel B and C input circuits are indirect. In the direct circuits, mark input results in mark output at the output circuit. In the indirect circuits, mark input results in space output.

This is a practical arrangement which affords a maximum of signal transitions, particularly during idle periods, from which currents for phase correction and synchronizing purposes may be derived at the associated receiving terminal. As shown the idle time signal, which is generated when all of the transmitters of bank 16 are on the respective stop segments, will comprise marking signals in channels A and D and spacing signals in channels C and B.

Referring to channel A, the signal from the transmitting distributor is impressed across resistor R91. The signal can be of either polarity, i. e., positive or negative for mark. In practice, a voltage of minus 20 volts D. C. represents a mark signal element. In this discussion, negative polarity will be assumed for mark and zero polarity or ground potential will be assumed for space. The sign is inverted in tube V12A and applied through resistor R121 to the electronic commutator portion of aggregating circuit 20 where it is combined with coincidence voltages and the resultant potential applied to the grid of a vacuum tube V15A. The resultant coincidence voltage comprises signal voltage and a voltage derived from two of the multivibrator stages of frequency divided chain 12. This voltage is positive for one basic aggregate time element and negative for three basic aggregate time elements. Signals from the other three input circuits are combined in the aggregating circuit with the other three phases of the coincidence voltage so that for each basic aggregate time element only the signal from one input circuit is passed to the output. The signal from each of the input circuits together with its coincidence voltage is connected to the grid of a separate tube. The tubes are biased so that they will not pass current unless signal voltage is present. As shown, the tubes are therefore in a "triple coincidence" circuit. The anodes of tubes V15A, V15B, V16A and V16B are connected together to supply current flow through resistor R124. The signal that appears across resistor R124 for the period of one basic channel time element is thus composed of the following: for the first basic aggregate time element it is input A signal; for the second basic aggregate time element, it is input C signal; for the third basic aggregate time element, it is input B signal; and for the fourth basic aggregate time element, it is input D signal.

The aggregated signal is then coupled to a signal regenerator circuit including an inspection and weight adjuster section 22, composed of tubes V17A, V18A, V19A, V19B multivibrator circuits 200 and 210 and associated components. The aggregated signal is applied to the grids of tubes V18A and V19A. Tube V18A serves only to invert the polarity of the signal so that the grids of tubes V19A and V19B have the same signal but in opposite polarity. The signals applied to the grids of tubes V19A and V19B can never cause these tubes to conduct since the grid signal varies from slightly below cut-off to very much below cut-off. Also applied to the same grids are positive pulses at aggregate signal element rate from tube V17A through capacitor C34, resistor R140 to the grid of tube V19B and through capacitor C35, resistor R236 to the grid of tube V19A. The source of these pulses is a multivibrator stage 60 in the frequency divider chain 12. For marking output, the anodes of tubes V15A, V15B, V16A, V16B are in their least positive condition; the grid of tube V19B is slightly below cut-off and the grid of tube V19A is very far below cut-off. Positive pulses applied to both grids will cause only tube V19B to conduct. When tube V19B conducts, a negative voltage is developed across resistor R143 to trigger the signal weight adjusting monostable multivibrator circuit 200 composed of tubes V20A, V20B and associated components in which it is connected. When multivibrator 200 is restored, a bistable multivibrator locking output signal regenerator circuit 210, composed of tubes V21A, V21B and associated components to its marking position is triggered, that is, tube V21B is rendered conducting, and tube V21A non-conducting. Since tube V21A is non-conducting, the anode is at essentially +B power supply potential and this positive voltage is coupled through a resistor R159 to the grid of a tube V18B which is the D.-C. output tube. The output voltage in this case is developed across resistor R163 and has the same polarity as the voltage applied to the grid of tube V18B.

When the signal at the anodes of tubes V15A, V15B, V16A and V16B is positive, that is, for spacing output, the grid of tube V19B is very far below cut-off and the grid of tube V19A is slightly below cut-off. The positive pulses applied to both grids will cause only tube V19A to conduct. Tube V19A conducts through resistor R151 and restores locking circuit 210 to its spacing position, that is, tube V21A conducting. Since the anode of tube V21A is essentially at ground, the voltage at the grid of tube V18B will be below cut-off and no current will flow through tube V18B. The voltage across resistor R163 will then be zero.

It often happens that a transmitted 50/50 weight signal, that is, one in which marking and spacing signal elements are equal, when received over a radio path will be heavier than 50/50. Therefore, provisions to make the signals as transmitted lighter than 50/50 are included. A potentiometer 203 increases the active time of multivibrator circuit 200 and delays all transitions to mark beyond normal. This potentiometer can vary the output signal from substantially 50/50 to much lighter than 50/50.

For on-off tone keying, a tone keyer 220 is coupled to tube V21A. The tone keyer consists of tube V22A, V22B and associated components. Its operation is described in the copending U. S. application Ser. No. 200,716 filed on or about December 14, 1950, by P. E. Volz thereafter issued June 10, 1952, as U. S. Patent 2,599,675. Capacitor C63 is used for neutralization, and the remainder of the circuit functions as described in the copending application.

PHASING CIRCUIT

From time to time it will be necessary to determine and adjust the phase relationship of the various currents produced by the circuits previously described. This is readily accomplished by a phasing circuit integrally connected to synchronizing and signal input circuits 14 and 18.

Referring to Figs. 2a and 2b, there is shown the phasing circuit comprising amplifier or mixer tubes V23A and V23B connected in a mixing circuit 230. A pulse generating locking circuit 240, comprising tubes V24A and V24B, is connected through ganged switches 233, 243, and 253 shown in Figs. 2c and 2d to the transmitting distributor synchronizing circuits and to the timing wave circuits and also to the anodes of the input tubes. By way of example, the phasing of channel A will be described. Monostable multivibrator circuit 250 is triggered by a pulse from vibrator circuit 110 over lead 112. On the restoration of circuit 250 to the stable condition, a synchronizing pulse is developed across resistors R200, R201 and a negative pulse is applied to the grid of tube V24A. This causes tube V24A of multivibrator circuit 240 to become non-conducting and tube V24B to conduct. A short time later, depending on the delays inherent in the particular transmitter distributor being used and the loop length, a signal arrives at the channel A input circuit. This signal is a positive transition from mark to space, that is, the start element of the 5-unit code signal train. Tube V12A is rendered conductive and a negative pulse is applied to the grid of tube V24B. The negative pulse causes tube V24A to conduct, tube V24B becomes non-conducting and a positive pulse is coupled through capacitor C43 and resistor R183 to the grid of tube V23B. This pulse represents the beginning of the channel A start element. The problem of phasing involves the placing of this pulse in its best position with respect to the inspection pulse of the aggregate element for channel A. The best position is defined as point allowing the most tolerance for variations in the transmitting-distributor timing. Any normal variations in timing should not cause incorrect aggregation.

To effect correct phasing, a coincidence signal from the frequency dividers is applied to the grid of tube V23A. Curve 501 of Fig. 5 represents the signal applied to tube V23A grid; curve 502 represents the resultant signal as applied to tube V23B anode. For correct phasing, the channel A start element should straddle aggregate A element somewhat, as shown in curve 503. It can thus be seen that for phasing channel A transmitting distributor, a coincidence signal which is positive for the channel D aggregate element must be applied to the grid of tube V23A. This gives the result illustrated by curve 503, that is, the anode of tube V23B is very nearly at ground potential for aggregate D element and at anode power supply potential for aggregate A, C and B elements. The positive pulse applied to the grid of tube V23B causes tube V23B to conduct. If tube V23B conducts at the same time tube V23A conducts, the voltage developed across resistor R185 and neon lamp N1 is insufficient to cause the lamp to glow. If tube V23B conducts when tube V23A is non-conducting, neon lamp N1 will glow. By varying the resistance of potentiometer 263 in the grid circuit of tube V25B, the time position of the derived pulse can be moved with respect to that of the coincidence signal pulse, that is, neon lamp N1 remains extinguished.

Channels C, B, and D are phased in exactly the same manner. Switches 233, 243 and 253 are used to select the proper signals to be mixed, and the potentiometer corresponding to the proper channel is then adjusted.

AGGREGATION SELECTION CIRCUITS

An extremely advantageous feature of an electronic multiplex transmitter according to the invention is the flexibility of circuitry which permits changing the aggregation on short notice. A master switch 260 is provided to facilitate changing from one aggregation to another.

Figure 2C:
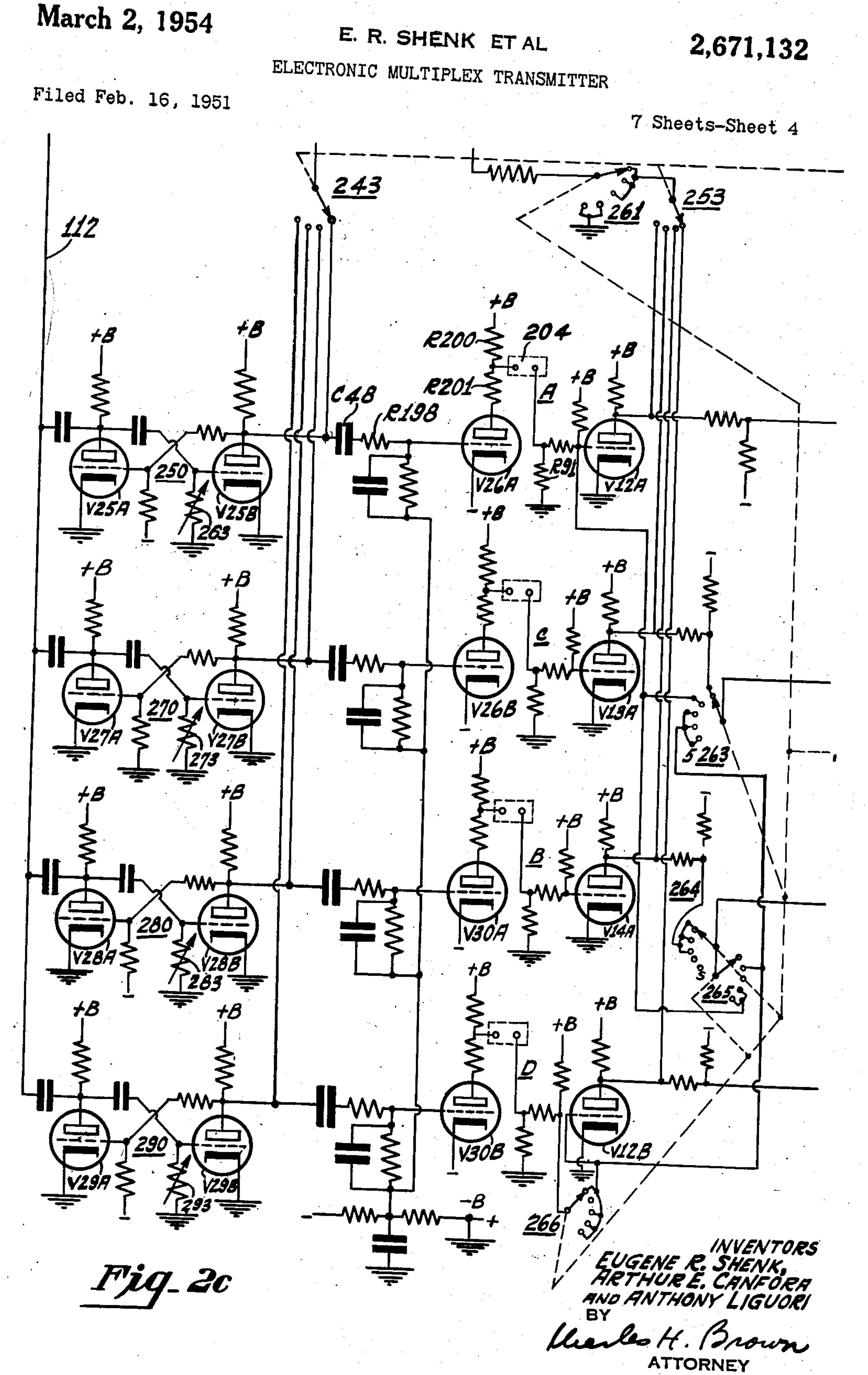
Figure 2D:
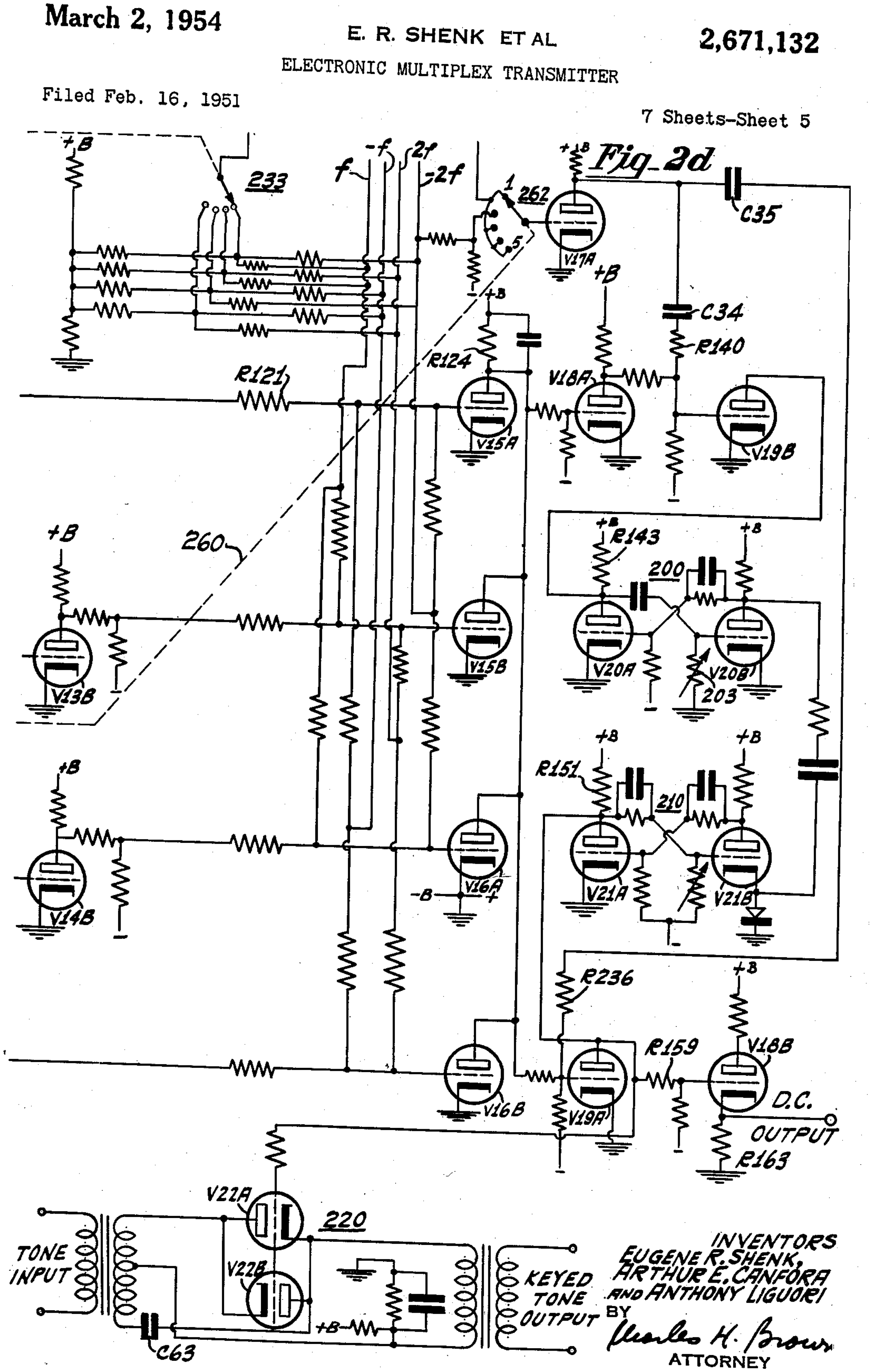

When master switch 260, comprising ganged switches 261—266, is in the Number 1 position, as shown in Figs. 2c and 2d, 4-channel, 5-unit aggregation is obtained. In this position, all four input circuits are usable and the four circuits are connected through to the four channelizing circuits. Each input signal thus controls the voltage developed across resistor R124 in the common anode circuit of tubes V15A, V15B, V16A and V16B for one-fourth of the time, in steps of one basic unit time element length. The order of aggregation is ACBD. In this position, 171$\frac{3}{7}$ C. P. S. or 200 C. P. S. from tube V3B are applied to the grid of tube V17A to form the inspection pulses one basic marking signal element apart. Also, in the Number 1 position, the neon lamp phasing system is in operative condition.

In the second position, the use of only two of the input circuits is permitted for 2-channel, 5-unit aggregation. The application of the "A" signal to two of the coincidence circuits in order is permitted. Thus the A input signal controls the voltage developed across resistor R124 for two aggregate 4-channel signal elements or a full half-speed signal element.

Also the application of the "B" signal to two of the coincidence circuits in order is permitted. Thus the B input signal also controls the voltage developed across resistor R124 for two aggregate 4-channel elements or the other half-speed element.

Channel A is the direct channel, that is, mark input signal results in mark output signal. Channel B is the indirect channel, wherein mark input results in space output signal.

In the above position, the 85$\frac{5}{7}$ C. P. S. or 100 C. P. S. wave from tube V7A is applied to tube V17A to form the inspection pulses at two-channel rate and the neon lamp phasing system is connected for operation.

In the third position of the master switch, aggregation is 2-channel, 5-unit and one diplex. Channel A is operated as a direct channel and channel B is operated as an indirect channel. Channels C and D are then operated as one diplex. The diplex signal is applied to the 171$\frac{3}{7}$ C. P. S. or 200 C. P. S. channel D input signal taken from tube V3B to form inspection pulses at basic aggregate time element rate. Neon lamp N1 is used for phasing channels A and B. Phasing for the diplex signals is accomplished directly in the diplex distributor through the use of the synchronizing voltage developed at terminals 171 and 172 across a resistor R90 in the cathode of tube V17B.

Position 4 allows for the operation of two diplexes; one diplex using channel A input and the other diplex using channel D input. Inspection pulses are obtained at 171$\frac{3}{7}$ C. P. S. or 200 C. P. S. rate. Diplex phasing is as described for position 3.

Position 5 permits one diplex operation. The signal is applied only to channel D input and is thus simultaneously applied to the grids of tubes V12A, V13B, V14B and V12B. Inspection pulses are at four-channel rate and diplex phasing is as described for the third position of the master switch.

APPENDIX

The following component part values were used in construction of an electronic multiplex transmitter as shown in Fig. 2 and mentioned in the foregoing specification operating at either 21$\frac{3}{7}$ C. P. S. or 25 C. P. S. corresponding to 42$\frac{6}{7}$ or 50 channel signal elements per second channel speeds. Obviously, other values can also be employed at suitable channel speeds.

*Capacitors*

| Reference No.: | | Value |
|---|---|---|
| C34 | mmfd | 0.00047 |
| C35 | mmfd | 0.00047 |
| C43 | mmfd | 0.001 |
| C48 | mmfd | 0.03 |

*Resistors*

| | | |
|---|---|---|
| R90 | ohms | 100K |
| R91 | do | 10K |
| R124 | do | 150K |
| R140 | do | 270K |
| R143 | do | 100K |
| R151 | do | 150K |
| R159 | do | 470K |
| R198 | do | 300K |
| R200 | do | 130K |
| R201 | do | 47K |
| R236 | do | 1500K |
| R203 | linear pot | 1000K |
| R263 | do | 500K |
| R273 | do | 500K |
| R283 | do | 500K |
| R293 | do | 500K |

*Tubes*

| Reference Number: | Type |
|---|---|
| V1A—V1B | 6SL7 |
| V2A—V2B | 6SL7 |
| V3A—V3B | 6SN7 |
| V4A—V4B | 6SN7 |
| V5A—V5B | 6SN7 |
| V6A—V6B | 6SN7 |
| V7A—V7B | 6SN7 |
| V8A—V8B | 6SN7 |
| V9A—V9B | 6SN7 |
| V10A—V10B | 6SN7 |
| V11A—V11B | 6SN7 |
| V12A—V12B | 6SL7 |
| V13A—V13B | 6SL7 |
| V14A—V14B | 6SL7 |
| V15A—V15B | 6SL7 |
| V16A—V16B | 6SL7 |
| V17A—V17B | 6SN7 |
| V18A—V18B | 6SN7 |
| V19A—V19B | 6SL7 |
| V20A—V20B | 6SN7 |

| | |
|---|---|
| V21A—V21B | 6SN7 |
| V22A—V22B | 6SN7 |
| V23A—V23B | 6SL7 |
| V24A—V24B | 6SN7 |
| V25A—V25B | 6SL7 |
| V26A—V26B | 6SN7 |
| V27A—V27B | 6SL7 |
| V28A—V28B | 6SL7 |
| V29A—V29B | 6SL7 |
| V30A—V30B | 6SN7 |

*Power supplies*

Two power supplies were used. One power supply having its negative terminal at ground, delivered 150 volts D. C. at 35 ma. to terminals marked +B. The other power supply having its positive terminal grounded delivered 150 volts D. C. at 24 ma. to terminals marked with the minus (—) sign.

The invention claimed is:

1. An electronic circuit arrangement for aggregating unit signal elements into a single train of aggregate signal elements including a wave generator for generating a plurality of electric waves harmonically related to the aggregate signal element rate, a plurality of synchronizing multivibrator circuits coupled to said wave generator to be triggered at signal character rate, each of said multivibrator circuits having time constants individually variable to render restoration of said multivibrator circuits in succession at a desired rate to generate start pulses, a plurality of signal input circuits, means to couple sources of said unit signal elements individually to said multivibrator and said signal input circuits, a plurality of controlled electron path devices having output electrodes connected in common and signal input electrodes individually coupled to said signal input circuits, said signal input circuits being coupled to said wave generator to apply said plurality of electric waves to said signal input electrodes in permutations at which but one of said controlled electron path devices is rendered conducting at any given time, an output signal regenerator circuit coupled to the output electrodes of said plurality of controlled electron path devices and comprising a bistable multivibrator arranged to be triggered oppositely on application of signal elements of opposite nature and a monostable multivibrator interposed in said circuit and having a time constant variable to vary the time duration of signal elements of one nature thereby to vary the weight of the output signal elements, a phase indicating circuit including a further multivibrator having one section thereof selectively coupled to one of said synchronizing multivibrator circuits and the other section coupled to the one signal input circuit corresponding to said one synchronizing multivibrator circuit, a mixer circuit coupled to said wave generator to obtain one of said harmonically related waves therefrom and to said further multivibrator to receive a pulse therefrom in response to receipt of a start pulse in said one input circuit, and a current-responsive indicating device coupled to said mixer circuit, said current responsive device being arranged to indicate when said received pulse occurs within the duration of one cycle of said obtained wave, said wave being selected from said harmonically related waves to indicate proper phasing.

2. An electronic time division multiplex telegraph transmitter including a wave generator for generating a plurality of electric waves harmonically related to the aggregate signal element rate, a plurality of monostable synchronizing multivibrator circuits coupled to said wave generator to be triggered at signal character rate, each of said monostable multivibrator circuits having time constants individually variable to render restoration of said monostable multivibrator circuits in succession at a predetermined rate to generate a series of start pulses, a plurality of signal input circuits, means to couple transmitting distributor apparatus individually to said monostable multivibrator and said signal input circuits, a plurality of vacuum tubes having anode and cathode electrodes connected in common and grid electrodes individually coupled to said signal input circuits, said signal input circuits being coupled to said wave generator to apply said plurality of electric waves to said grid electrodes in permutations at which but one of said vacuum tubes is rendered conducting at any given time, an output signal regenerator circuit coupled to the anode electrodes of said plurality of vacuum tubes, said signal regenerator circuit comprising a monostable and a bistable multivibrator, said bistable multivibrator being arranged to be triggered in opposite directions, to one condition in response to application of signal elements of one nature and to the other condition on application of signal elements of opposite nature, said monostable multivibrator being interposed in said regenerator circuit and having a time constant variable to vary the time duration of signal elements of one nature thereby to vary the weight of the output signal elements, a circuit for indicating the proper phase relationship between said start pulses generated by restoration of said synchronizing multivibrator circuit and the gating of said vacuum tubes, said circuit including a bistable pulse generating multivibrator having one section thereof selectively coupled to one of said monostable synchronizing multivibrators and the other section coupled to the one signal input circuit corresponding to said one monostable synchronizing multivibrator, a mixer circuit coupled to said generator to obtain one of said harmonically related waves therefrom and to said bistable pulse generating multivibrator to receive a pulse therefrom in response to receipt of a start pulse in said one signal input circuit, and a current-responsive indicating device coupled to said mixer, said current responsive device being arranged to indicate when said received pulse occurs within the duration of a positive cycle of said harmonically related wave, said wave being the one of said harmonically related waves for gating the vacuum tube coupled to the signal input circuit corresponding to the monostable synchronizing multivibrator restored prior to said one monostable synchronizing multivibrator.

3. An electronic time division multiplex telegraph transmitter including a binary counting circuit for generating a plurality of electric waves of squarewave form harmonically related to the aggregate signal element rate in response to an applied sine wave potential, a plurality of monostable synchronizing multivibrator circuits coupled to said counting circuit to be triggered simultaneously at signal character rate, each of said monostable multivibrator circuits having time constants individually variable to render restoration of said monostable multivibrator circuits in succession at signal character rate, a plurality of signal input circuits, substantially half of said signal input circuits having outputs of polarity opposite to that of the other signal input circuits, means to couple transmitting distributor apparatus individually to said monostable synchronizing multivibrator and said signal input circuits, a plurality of triode vacuum tubes having anode and cathode electrodes connected in common and grid electrodes individually coupled to said signal input circuits, said signal input circuits being coupled to said counting circuit to apply said plurality of square waves to said grid electrodes in permutations at which but one of said triode vacuum tubes is rendered conducting at any given time, said tubes being biased to conduct only when signal elements of one nature are applied to the grid electrodes thereof, an output signal regenerator circuit coupled to the anode electrodes of said plurality of triode vacuum tubes, said signal regenerator circuit comprising a bistable multivibrator arranged to be triggered in opposite directions on application of signal elements of opposite nature and a monostable multivibrator interposed in said regenerator circuit and having a time constant variable to vary the time duration of signal elements of one nature thereby to vary the weight of the output signal elements, a circuit for indicating the proper phase relationship between the restoration of said monostable synchronizing multivibrators and the gating of said triode vacuum tubes including a bistable pulse generating multivibrator having one section thereof selectively coupled to one of said monostable synchronizing multivibrators and the other section coupled to the one signal input circuit corresponding to said one monostable synchronizing multivibrator, a mixer tube circuit coupled to said counting circuit to obtain one of said harmonically related waves therefrom and to said bistable pulse generating multivibrator to receive a pulse therefrom in response to receipt of a start pulse in said one signal input circuit, and a neon bulb indicating device coupled to the output of said mixer tube circuit, said mixer tube circuit being arranged to extinguish said neon bulb when said received pulse occurs within the duration of a positive half-cycle of said obtained wave, said wave being the gating wave for the triode vacuum tube normally gated immediately prior to the gating of the triode vacuum tube the phase relationship of which is under consideration.

4. An electronic time division multiplex telegraph transmitter including a wave generator for generating a plurality of electric waves harmonically related to the aggregate signal element rate, a plurality of monostable synchronizing multivibrator circuits coupled to said wave generator to be triggered at signal character rate, each of said monostable synchronizing multivibrator circuits having timed constants individually variable to render restoration of said monostable multivibrator circuits in succession at a predetermined rate to generate a series of start pulses, a plurality of signal input circuits, means to couple transmitting distributor apparatus individually to said monostable multivibrator and said signal input circuits, a plurality of commutator vacuum tubes having anode and cathode electrodes connected in common and grid electrodes individually coupled to said signal input circuits, said signal input circuits being coupled to said wave generator to apply said plurality of electric waves to said grid electrodes in permutations at which but one of said vacuum tubes is rendered conducting at any given time, an output signal regenerator circuit coupled to the anode electrodes of said plurality of vacuum tubes, said signal regenerator circuit comprising monostable and bistable multivibrators, said bistable multivibrator being arranged to be triggered in opposite directions to one condition in response to application of signal elements of one nature and to the other condition on application of signal elements of the opposite nature, said monostable multvibrator being interposed in said regenerator circuit and having a time constant variable to vary the time duration of signal elements of one nature thereby to vary the weight of the output signal elements.

5. An electronic time division multiplex telegraph transmitter including a wave generator for generating a plurality of electric waves harmonically related to the aggregate signal element rate, a plurality of monostable multivibrator synchronizing circuits coupled to said wave generator to be triggered at signal character rate, each of said monostable multivibrator synchronizing circuits having time constants individually variable to render restoration of said monostable multivibrator circuits in succession at a predetermined rate to generate a series of start pulses, a plurality of signal input circuits, means to couple transmitting distributor apparatus individually to said monostable multivibrator synchronizing and said signal input circuits, a plurality of commutator vacuum tubes having anode and cathode electrodes connected in common and grid electrodes individually coupled to said signal input circuits, said signal input circuits being coupled to said wave generator to apply said plurality of electric waves to said grid electrodes in permutations at which but one of said vacuum tubes is rendered conducting at any given time, an output signal circuit coupled to the anode electrodes of said plurality of vacuum tubes, a circuit for indicating the proper phase relationship between said start pulses generated by restoration of said multivibrator synchronizing circuit and the gating of said commutator vacuum tubes, said circuit including a bistable pulse generating multivibrator having one section thereof selectively coupled to one of said monostable synchronizing multivibrators and the other section coupled to the one signal input circuit corresponding to said one monostable synchronizing multivibrator, a mixer circuit coupled to said generator to obtain one of said harmonically related waves therefrom and to said bistable pulse generating multivibrator to receive a pulse therefrom in response to receipt of a start pulse in said one signal input circuit, and a current-responsive indicating device coupled to said mixer circuit, said current-responsive device being arranged to indicate when said received pulse occurs within the duration of a positive cycle of said harmonically related wave, said wave being the one of said harmonically related waves for gating the vacuum tube coupled to the signal input circuit corresponding to the synchronizing monostable multivibrator restored prior to said one monostable synchronizing multivibrator.

6. In a signalling system wherein a plurality of unit signal element trains are successively initiated in response to applied start pulses and the unit signal elements are sequentially assigned to a common transmission medium in response to application of a plurality of locally-generated waves of frequency harmonically related to the aggregate signal element rate, a phase comparing circuit arrangement for determining the optimum phase relationship between said start pulses and the locally-generated waves, including a bistable multivibrator pulse generating circuit having two conditions of stable operation, one of which is established in response to application of one of said start pulses and the other is established in response to the first transition of the output signal train initiated in response to said one start pulse, a mixing circuit coupled to said bistable multivibrator circuit to receive a timing pulse generated thereby in response to application of said first transition pulse to said bistable multivibrator, one of said locally-generated waves being applied to said mixing circuit, said one wave being selected for proper timing of said one start pulse, a current responsive indicator coupled to said mixing circuit, said indicator providing an indication when said timing pulse is within the operative range of said one locally-generated wave.

7. In a time division multiplex signalling system, an electronic commutator circuit arrangement including means to derive a plurality of alternating potential waves at a plurality of integrally related frequencies, a plurality of controlled electron path devices each having input and output electrodes, and circuits for applying signal voltages to said input electrodes, said electrodes being supplied with operating potential normally preventing current flow in said output electrodes, means to apply said alternating potential waves to each of said controlled electron path devices, the phases of said alternating potentials being permuted among the plurality of controlled electron path devices to render only one of said devices operative for current flow in the output electrode thereof for the duration of any one-half cycle of the highest frequency in each cycle of the lowest frequency.

8. In a telegraphic signalling system, a signal regenerating and weighting circuit arrangement comprising a pair of electron discharge systems each having a cathode, a control grid and an anode, means to apply a signal to the control grid of one of said electron discharge systems in given polarity, means to apply said signal to the control grid of the other of said systems in opposite polarity, means to bias the control grids of said electron discharge systems to prevent anode-cathode current flow, means to apply positive pulses at unit signal element rate to the grid electrodes of said electron discharge systems, said pulses and said signals having relative amplitudes at which only the electron discharge system having both a signal element and a pulse on the control grid thereof will conduct, a bistable multivibrator circuit coupled to said one electron discharge system to be triggered by said one electron discharge system to produce an output pulse corresponding to signal elements of one nature, a monostable multivibrator having the input thereof coupled to said other electron discharge system to be triggered thereby on signal elements of another nature and the output coupled to said bistable multivibrator circuit to produce an output pulse corresponding to signal elements of said other nature on restoration of said monostable multivibrator, said monostable multivibrator having an element thereof variable in order to vary the restoration time of said monostable multivibrator to vary the length of regenerated signal elements of said other nature thereby to vary the weight of said signal.

9. In a time division multiplex signalling system, a commutator circuit arrangement comprising a plurality of electron discharge systems each comprising cathode, control and anode electrodes, means to derive a plurality of harmonically related alternating current waves, means to apply a signal voltage individually to the control electrodes of said electron discharge systems, said systems being biased to prevent anode-cathode electrode current flow, means to apply each of said harmonically related waves to all of said control electrodes of said electron discharge systems, one half in given phase and one half in opposite phase to permute the phases between said electron discharge systems to render but one control electrode in operative coincidence at any given time and oppose the bias to permit anode-cathode electrode current flow in the electron discharge system controlled by said one electrode in response to the signal voltage applied to the control electrode thereof.

10. In a mark-space telegraphic signalling system, a signal regenerating and weighting circuit arrangement comprising a pair of electron discharge systems each having a cathode, a control grid and an anode, means to apply a signal to the control grid of one of said electron discharge systems, means to invert the polarity of said signal, means to apply said inverted signal to the control grid of the other of said electron discharge systems, means to bias the control grids of said electron discharge systems to prevent anode-cathode current flow, means to generate a train of positive pulses at aggregate signal element rate, means to apply said pulses to the grid electrodes of said electron discharge systems, said pulses and said signals having relative amplitudes with respect to bias potentials at which only the electron discharge system having both a positive signal element and a pulse on the control grid thereof will conduct, a bistable multivibrator circuit coupled to said one electron discharge system to be triggered by said one electron discharge system to produce an output pulse corresponding to spacing signal elements, a monostable multivibrator circuit having the input thereof coupled to said other electron discharge system to be triggered thereby on marking signal elements, and the output coupled to said bistable multivibrator circuit to produce an output pulse corresponding to marking signal elements on restoration of said monostable multivibrator, said monostable multivibrator having an element thereof variable in order to vary the restoration time of said monostable multivibrator to vary the length of regenerated marking signal elements thereby to vary the weight of said signal.

11. In a time division multiplex signalling system wherein a plurality of distributors are successively actuated by start pulses and the output signals of said distributors are sequentially assigned to a common transmission medium in response to application of a plurality of locally-generated waves of frequency harmonically related to the aggregate signal element rate, a phase comparing circuit arrangement for determining the optimum phase relationship between said start pulses and the locally-generated waves, including a bistable multivibrator circuit having two conditions of stable operation, one of which is established in response to application of one of said start pulses and the other is established in response to application of the first transition of the output signal train initiated in response to said one start pulse to said bistable multivibrator, a mixing circuit coupled to said bistable multivibrator circuit to receive a timing pulse generated in response to said application of said first transition pulse to said bistable multivibrator, one of said locally-generated waves being applied to said mixing circuit, said one wave being selected for proper timing of said one start pulse, a voltage-responsive indicator coupled to said mixing circuit, said indicator providing an indication when said timing pulse is within the operatve range of said one locally-generated wave.

12. In a time division multiplex signalling system, an electronic commutator circuit arrangement including means to derive a plurality of alternating potential waves at a plurality of integrally related frequencies, a plurality of electron discharge systems each having cathode, control grid and anode electrodes, and circuits for applying signal voltages to said control grid electrodes, said electron discharge systems being supplied with operating potential normally preventing current flow in the anode-cathode electrode circuit, means to apply said alternating potential waves to each of said control grid electrodes, the phases of said alternating potentials being permuted among the plurality of electron discharge systems to render only one of said electron discharge systems operative for current flow in the anode-cathode path thereof for the duration of any one-half cycle of the highest frequency in each cycle of the lowest frequency.

13. In a time division multiplex signalling system wherein a plurality of signal distributors are successively actuated by start pulses and the output signals of said distributors are sequentially assigned by an electronic gating circuit to a common transmission medium in response to application of a plurality of locally-generated gating waves of frequency harmonically related to the aggregate signal element rate, a phase comparing circuit arrangement for determining the optimum phase relationship between said start pulses and the gating waves, including a bistable multivibrator circuit having two conditions of stable operation, one of which is established in response to application to said bistable multivibrator circuit of one of said start pulses and the other is established in response to application of the first transition of the output signal train initiated in response to said one start pulse, a mixing tube circuit coupled to said bistable multivibrator circuit to receive a timing pulse generated in response to said application of said first transition pulse to said bistable multivibrator, a neon bulb indicator coupled to said mixing tube circuit, said neon bulb normally glowing, means to apply one of said gating waves to said mixing tube circuit to extinguish said neon bulb on simultaneous application of said timing pulse and said one gating wave, said one gating wave being that applied to said electronic gating circuit to gate the unit signal element immediately prior to the unit signal element obtained from the distributor under consideration.

14. In a multiplex signalling system, a plurality of channels each having a source of signals conveying intelligence by variation of amplitude, an electronic commutator circuit arrangement including means to derive a plurality of alternating current waves at a plurality of integrally related frequencies, a plurality of controlled electron path devices each having input and output electrodes, and circuits for connecting said channels individually to said input electrodes, said electrodes being supplied with operating potential normally preventing current flow in said output electrodes, means to apply said alternating potential waves to each of said controlled electron path devices, the phases of said alternating potentials being permuted among the plurality of controlled electron path devices to render only one of said devices operative for current flow in the output electrode thereof for the duration of any one-half cycle of the highest frequency in each cycle of the lowest frequency thereby to pass a portion of the signal applied to said one device, an output impedance element connected in common to said output electrodes for combining the outputs of the devices into a composite signal, and a keying circuit coupled to said common output impedance element.

15. In a time division multiplex signalling system, a plurality of channels each having a source of signals of mark space telegraph code characters, a commutator circuit arrangement comprising a plurality of electron discharge system circuits associated with said channels, the electron discharge systems of said circuits each comprising cathode, control and anode electrodes, means to derive a plurality of harmonically related alternating current waves, means to connect said channels individually to the control electrodes of said electron discharge systems, said systems being biased to prevent anode-cathode electrode current flow, means to apply each of said waves to all of said control electrodes of said electron discharge systems, one half in given phase and one half in opposite phase to permute the phases among said systems to render but one control electrode in operative coincidence at any given time and oppose the bias to permit anode-cathode electrode current flow in the corresponding system in response to the signals applied to the control electrode thereof, an output impedance element connected in common to said anode electrodes, and a keying circuit coupled across said common output impedance element.

16. In a multiplex signalling system, a plurality of channels each having a source of signals conveying intelligence by variation of amplitude, an electronic commutator circuit arrangement including means to derive a plurality of waves varying in amplitude between limits at a plurality of integrally related frequencies, a plurality of controlled electron path devices each having input and output electrodes, and circuits for applying said signals individually to said input electrodes, said electrodes being supplied with operating potential normally preventing current flow in said output electrodes, means to apply said waves to each of said controlled electron path devices, the phases of said waves being permuted among the plurality of controlled electron path devices to render only one of said devices operative for current flow in the output electrode thereof for any one-half cycle of the highest frequency for each cycle of the lowest frequency thereby to pass a portion of the signal applied to said one device, and an output impedance element connected in common to said output electrodes for combining the outputs of the devices into a composite signal.

17. In a time division multiplex signalling system, a plurality of channels each having a source of signals of mark space telegraph code characters, a commutator circuit arrangement comprising a plurality of electron discharge system circuits associated with said channels, the electron discharge systems of said circuits each comprising cathode, control and anode electrodes, means to derive a plurality of harmonically related waves varying in amplitude between limits, means to apply said signals individually to the control electrodes of said electron discharge systems, said systems being biased to prevent anode-cathode electrode current flow, means to apply each of said waves to all of said control electrodes of said electron discharge systems, one half in given phase and one half in opposite phase to permute the phases among said systems to render but one control electrode in operative coincidence at any given time and oppose the bias to permit anode-cathode electrode current flow in the electron discharge system having said one controlled electrode therein in response to the signals applied to said control electrode thereof, and an output impedance element connected in common to said anode electrodes.

EUGENE RICHARD SHENK.
ANTHONY LIGUORI.
ARTHUR EUGENE CANFORA.

References Cited in the file of this patent

UNITED STATES PATENTS

| Number | Name | Date |
|---|---|---|
| 2,365,450 | Bliss | Dec. 19, 1944 |
| 2,479,020 | Pelmulder | Aug. 16, 1949 |
| 2,513,910 | Bliss | July 4, 1950 |
| 2,520,953 | Norris et al. | Sept. 5, 1950 |
| 2,609,452 | Hansen | Sept. 2, 1952 |

FOREIGN PATENTS

| Number | Country | Date |
|---|---|---|
| 613,084 | Great Britain | Nov. 22, 1948 |